C. W. BORGNER.

SANITARY CLOSURE FOR BOTTLES.

APPLICATION FILED MAR. 4, 1922.

Reissued May 2, 1922. 15,346.

Inventor

CONRAD W. BORGNER

By Franklin H. Hough

Attorney

UNITED STATES PATENT OFFICE.

CONRAD W. BORGNER, OF LOWVILLE, NEW YORK.

SANITARY CLOSURE FOR BOTTLES.

15,346. Specification of Reissued Letters Patent. Reissued May 2, 1922.

Original No. 1,343,760, dated June 15, 1920, Serial No. 279,697, filed February 28, 1919. Application for reissue filed March 4, 1922. Serial No. 541,178.

*To all whom it may concern:*

Be it known that I, CONRAD W. BORGNER, a citizen of the United States, residing at Lowville, in the county of Lewis and State of New York, have invented certain new and useful Improvements in Sanitary Closures for Bottles, of which the following is a specification, reference being had therein to the accompanying drawings.

This invention relates to new and useful improvements in caps or closures for milk and other bottles and consists in the provision of means for sealing the bottle and protecting the lip from soil and foreign matter, comprising a simple and efficient device of this character having various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which.

Reference now being had to the details of the drawings by letter:

A designates an ordinary milk bottle having the usual seat B in the neck thereof for the reception of a closure. My improved cap is designated by letter D in Fig. 1, and is made preferably of paper of one or more layers of suitable thickness, or any other material which may be adapted for the purpose. The cap is pressed to form an annular beading E, with a central upwardly convexed portion F, said beading being designed to be held by the elasticity of the central portion upon the seat B, while the portion of the cap outside of said beading is outwardly curved as at H, and adapted to conform to and rest upon the curved top of the neck, as shown, thus forming a sanitary protection therefor.

Figure 1:
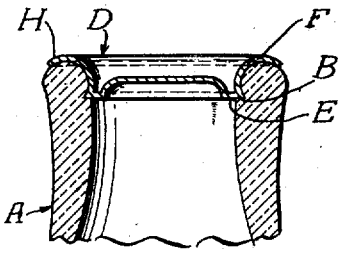
Figure 1 is a sectional view through the upper portion of the neck of a bottle with cap sealed therein.
Figure 2:
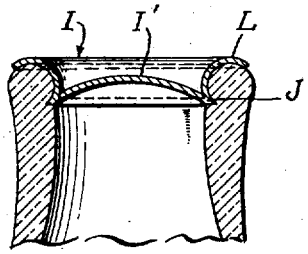
Figures 2 and 3 are central views showing slightly modified forms of the cap.

In the modified form shown in Fig. 2, the cap I has an upwardly convexed central portion I′ with a rib J adapted to engage frictionally the seat, while an outwardly curved portion outside the rib, designated by letter L, snugly fits the curved convex portion of the neck in the same manner as shown in Fig. 1.

Figure 3:
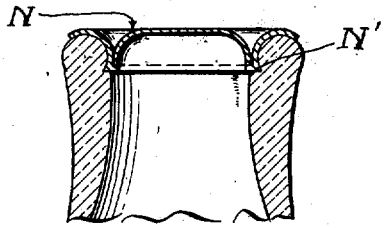

In the form shown in Fig. 3 the cap N is formed in a slightly different manner than in Figs. 1 and 2, with the central or crown portion of the cap flush with the top of the neck, and has an annular rib N′ engaging the seat, the portions of the cap intermediate the crown and the part which engages over the top of the bottle being in contact with each other, and forming means for frictionally holding the cap securely in place.

Figure 4:
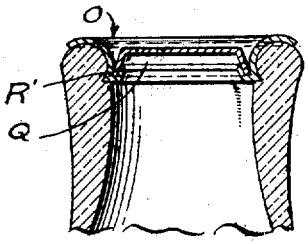
Figure 4 is a sectional view showing a still differently modified form of the cap.
Figure 6:
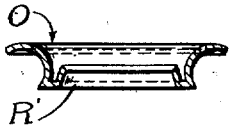
Figures 5 and 6 are details of the modified forms shown in Figure 4.
Figure 5:
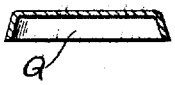

In Fig. 4 of the drawings I have shown the cap made of two pieces, designated respectively by letters O and Q, the former having a central opening R formed therein with an upturned edge R′, while the outer portion of the cap portion O is concaved and is adapted to fit over the top of the bottle in the same manner as shown in the other figures of the drawings. Said piece Q which is of inverted cup shape has a circumferential inclined wall and is adapted to engage underneath the upturned part R′ when the parts are pressed together, thus making a tight joint, and the space intermediate the parts O and Q above their interlocked ends may be coated with paraffin, or any other suitable material for hermetically sealing the cap.

By the provision of a closure for milk bottles embodying the features of my invention, it will be noted that the outer marginal edge of the cap is of smaller diameter than the diameter of the neck of the bottle opposite the usual seat for the cap and thereby eliminates all accidental displacement of the cap, which has been the common fault with closures where the overlapping part of the cap extends beyond the circumference of the outer wall of the exit end of the neck, the natural resiliency of the material permitting slight variations of diameter of the parts to conform to necks varying slightly from uniformity, and serving to securely hold the cap seated, and forming a thoroughly sanitary closure.

What I claim to be new is:

1. A closure for milk and other bottles, comprising a portion with a central annular opening with an upturned edge, which rests upon the seat within the neck of a bottle, an inverted cup section, the marginal edge of which interlocks with said upturned edge and holds the closure to its seat.

2. A closure for milk bottles, comprising a section with a central opening having an upturned edge, and an outwardly flaring concaved part for engagement with the top of the neck of the bottle, an inverted cup with a circumferential inclined wall designed to interlock with said upturned edge and tending to hold by its natural elasticity the closure upon the seat in the neck of a bottle.

3. A closure for a milk bottle provided with a circular neck and an annular seat, said closure comprising an upwardly concaved central portion having its margin proportioned for seating upon the seat, and an externally upwardly and outwardly curved flange proportioned to cover the inner and upper surface of the said neck.

4. A closure for a milk bottle having a circular neck and annular shoulder within the neck, said closure comprising an upwardly concaved contractible portion having its outer margins proportioned to seat upon the shoulder with a flange external of said margin extending upwardly and outwardly to cover the inner and upper surface of said neck.

5. A closure for a milk bottle having a circular neck and annular shoulder, said closure comprising an upwardly concaved portion and surrounding flange portion, both contractible to form a margin adapted to rest upon shoulders of varying diameters, said flange extending upwardly and outwardly to cover the inner and upper surface of the neck.

In testimony whereof I hereunto affix my signature.

CONRAD W. BORGNER.